United States Patent [19]
Frutschi

[11] 3,864,919
[45] Feb. 11, 1975

[54] RELIEF ARRANGEMENT FOR CLOSED GAS TURBINE INSTALLATION

[76] Inventor: Hansulrich Frutschi, Bruggerstrasse 292, 5223 Riniken, Switzerland

[22] Filed: May 21, 1974

[21] Appl. No.: 472,047

[30] Foreign Application Priority Data
June 8, 1973  Switzerland.......................... 8344/73

[52] U.S. Cl.................... 60/657, 60/660, 60/682
[51] Int. Cl............................................ F01d 17/06
[58] Field of Search ............ 60/646, 650, 657, 682, 60/660

[56] References Cited
UNITED STATES PATENTS
2,642,721  6/1953  Mallinson ........................ 60/682 X FOREIGN PATENTS OR APPLICATIONS
663,184  12/1951  Great Britain....................... 60/682

*Primary Examiner*—Martin P. Schwadron
*Assistant Examiner*—Allen M. Ostrager
*Attorney, Agent, or Firm*—Robert A. Ostmann

[57] ABSTRACT

Relief arrangement for a gas turbine installation with an endless flow path for the operating medium; a relief pipe being provided which leads from a position of high pressure in said flow path to a position of lower pressure in said flow path; said relief pipe comprising at least two jointly redundant regulating valves connected parallel to one another as regards said operating medium; the improvement that a quantity limiter connected in series with said regulating valves is incorporated into said relief pipe.

7 Claims, 2 Drawing Figures

3,864,919

RELIEF ARRANGEMENT FOR CLOSED GAS TURBINE INSTALLATION

BACKGROUND OF THE INVENTION

The invention relates to a relief arrangement for a closed gas turbine installation, which comprises in an endless flow path for the operating medium a compressor, a heater and a turbine, a relief pipe being provided which leads from a position of high pressure in the flow path to a position of lower pressure in said path, and comp- prises at least two jointly redundant regulating valves connected in parallel with one another as regards the operating medium.

In known closed gas turbine installations, a compressor return flow pipe which is closed in normal operation is used for the quick relief. With load-shedding of the driven generator, the generated power is brought to zero by opening the return flow pipe of the compressor. This has to take place in such a short time that the speed of rotation of the gas turbine installation does not exceed the prescribed overspeed.

Furthermore, redundance is required for the quick release, i.e., at least two regulating valves connected in parallel with one another as regards the operating medium are provided in the relief pipe.

Now if the second regulating valve of the relief pipe is only opened after a failure of the first rugulating valve has been detected, the quick relief is very greatly delayed. However, if both regulating valves of the relief pipe open simultaneously, for example, with failure of the control oil pressure, it is true that the quick relief is improved by shortening the time which is necessary for this relief, but a very rapid pressure drop is caused in the high pressure part of the gas turbine installation. A too rapid pressure drop is however dangerous to the heater.

SUMMARY OF THE INVENTION

The invention has for its objects to provide a relief arrangement for a closed gas turbine installation, which simultaneously permits a sufficiently rapid quick relief and assures a sufficiently slow fall in the pressure of the operating medium in the high pressure part.

In a relief arrangement as initially set forth, this object is achieved according to the invention by the fact that a quantity limiter connected in series with the regulating valves which are connected to one another in parallel is incorporated into the relief pipe.

This quantity limiter can be formed by a constriction in the relief pipe. The quantity limiter is advantageously constructed as a Venturi nozzle. However, a turbine arranged in the relief pipe can also serve as quantity limiter.

Furthermore, it is advantageous if at least two regulating circuits of the regulating valves connected parallel to one another have characteristics which are different from one another. In this case, the regulating circuits can comprise ranges of proportionality which are different from one another. Similarly, the integral or differential values of the regulating circuits can be different from one another.

BRIEF DESCRIPTION OF THE DRAWING

In the drawing, by reference to which the invention is more fully explained, constructional examples of the arrangement according to the invention are shown in simplified form. In the drawing.

Parts which correspond to one another are provided in the two Figures with the same reference numerals.

DESCRIPTION OF THE PREFERRED EMBODIMENTS

Figure 1:
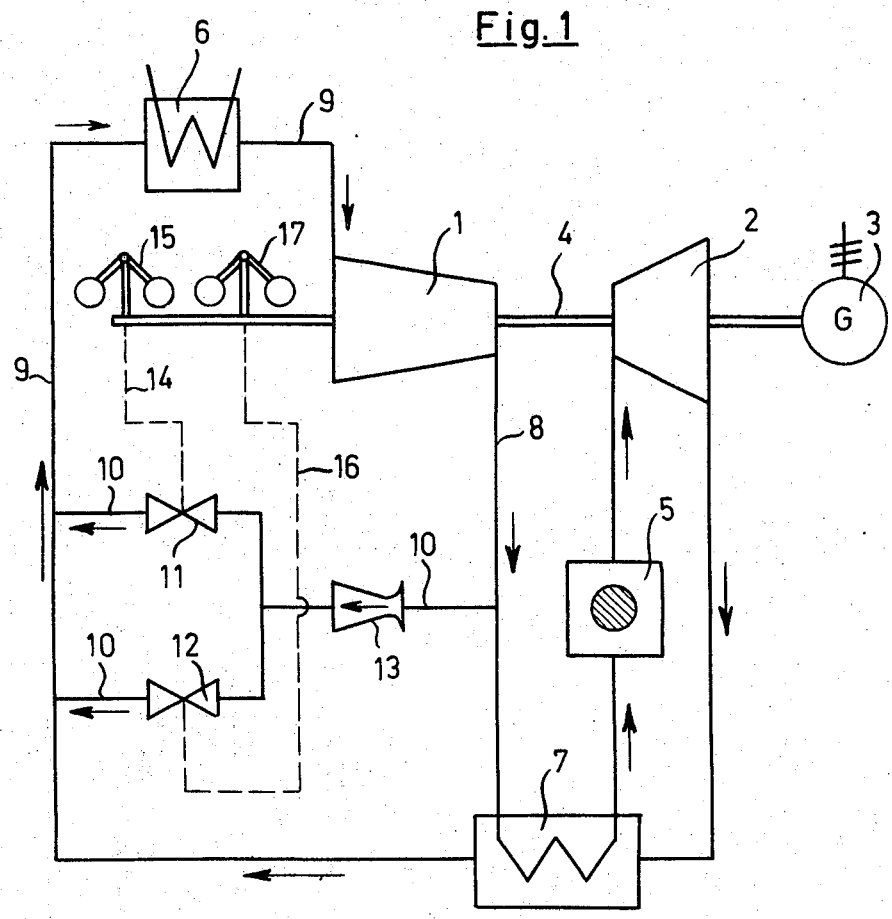
FIG. 1 is a diagram of a closed gas turbine installation with the relief control means according to the invention.

The gas turbine installation which is shown in FIG. 1 comprises a compressor 1, a turbine 2 and a current generator 3, these all being arranged on a common shaft 4. The turbine 2 receives hot operating medium from a heater 5, namely, from a nuclear reactor, and generates the power which is necessary for driving the current generator 3 and the compressor 1. A heat-lowering device, i.e., a condenser 6, is provided to complete the thermodynamic cyclic process. For improving the efficiency, a recuperative heat exchanger 7 is provided, which preheats the operating medium flowing from the compressor 1 to the heater 5, with partial utilisation of the waste heat of the turbine 2. The high pressure section of the endless flow path is represented at 8 and the low pressure section of the said path by 9. A relief pipe 10 extends from the high pressure section 8 of the flow path to the low pressure section 9 thereof. The relief pipe is here a compressor return flow pipe as known per se. Arranged in this relief pipe 10 are two regulating valves 11 and 12 which are connected parallel to one another as regards the operating medium. The valves are jointly redundant, i.e., both the regulating valve 11 alone and the regulating valve 12 alone are of such a size that one valve is sufficient for the quick relief.

A quantity limiting arrangement 13 is installed in the relief pipe 10 and is connected in series with the regulating valves 11 and 12 which are connected parallel to one another. In the constructional example, the quantity limiter 13 is disposed before the two regulating valves 11 and 12 connected parallel to one another, considered in the direction of flow of the operating medium. However, the quantity limiter could also be disposed behind the regulating valves (in a reunited piping section of the relief pipe 10).

The quantity limiter 13 is constructed as a Venturi nozzle and is of such dimensions that, firstly, the quick relief of the gas turbine installation proceeds sufficiently quickly and, secondly, the pressure drop in the high pressure section of the gas turbine installation proceeds sufficiently slowly.

As represented by a line 4 indicating the action. the regulating valve 11 has a separate regulating circuit with a separate governor 15. The regulating valve 12, as indicated by the line 16, also has a separate regulating circuit with a separate governor 17. The two governors 15 and 17 are constructed as speed governors driven by the shaft 4.

The means for regulating the relief as described operates in the following manner. If the current generator 3 loses its load for any reason, the speed of rotation of the shaft 4 starts to increase, because of the unbalance in power of the turbine 2 relatively to the current generator 3. In order to limit the rise, the two governors 15 and 17 start to open their associated regulating valves 11 and 12, respectively, to such an amount that the additional mass flow conveyed by the compressor 1 once again produces power equilibrium or balance on the shaft 4, because of the now greater compressor power input.

In order to achieve this result, it is sufficient if either both regulating valves are half opened or even one of them is fully opened. In this respect, simple redundance of the relief arrangement exists, and the quantity limiter 13 prevents a too rapid pressure drop in the high pressure section, i.e., in the heater 5, in the event of both regulating valves 11 and 12 being completely opened because of a defect or any instablility in the regulating system. The quantity limiter 13 is of such dimensions that sonic speed is reached in its narrowest cross-section, in the event of both regulating valves 11 and 12 being half opened and in the event of one of the regulating valves 11 and 12 being fully opened.

In order to achieve stable regulating conditions in these circumstances, the speed governor 15 has a range of proportionality of 4 percent and the speed governor 17 has a range proportionality of 6 percent. The effect of this is that, under undisturbed conditions, i.e., when both regulating circuits are operating normally, the shaft 4 will present a constant overspeed of less than 4 percent after there has been load-shedding of the current generator 3, since the regulating valve 11 will only be partly but more than half open and the residual throughflow cross-section is formed by the regulating valve 12, of which the speed governor has a larger range of proportionality. In compound operation, therefore, the two regulating valves 11 and 12 are not opened equally, and this produces stable regulating conditions, However, in the event of one of the two regulating circuits 11, 14, 15 or 12, 16, 17 being disrupted, the regulating valve of the regulating circuit still capable of operation will be fully opened, and then the speed regulation will show a range of proportionality of 4 or 6 percent.

Figure 2:
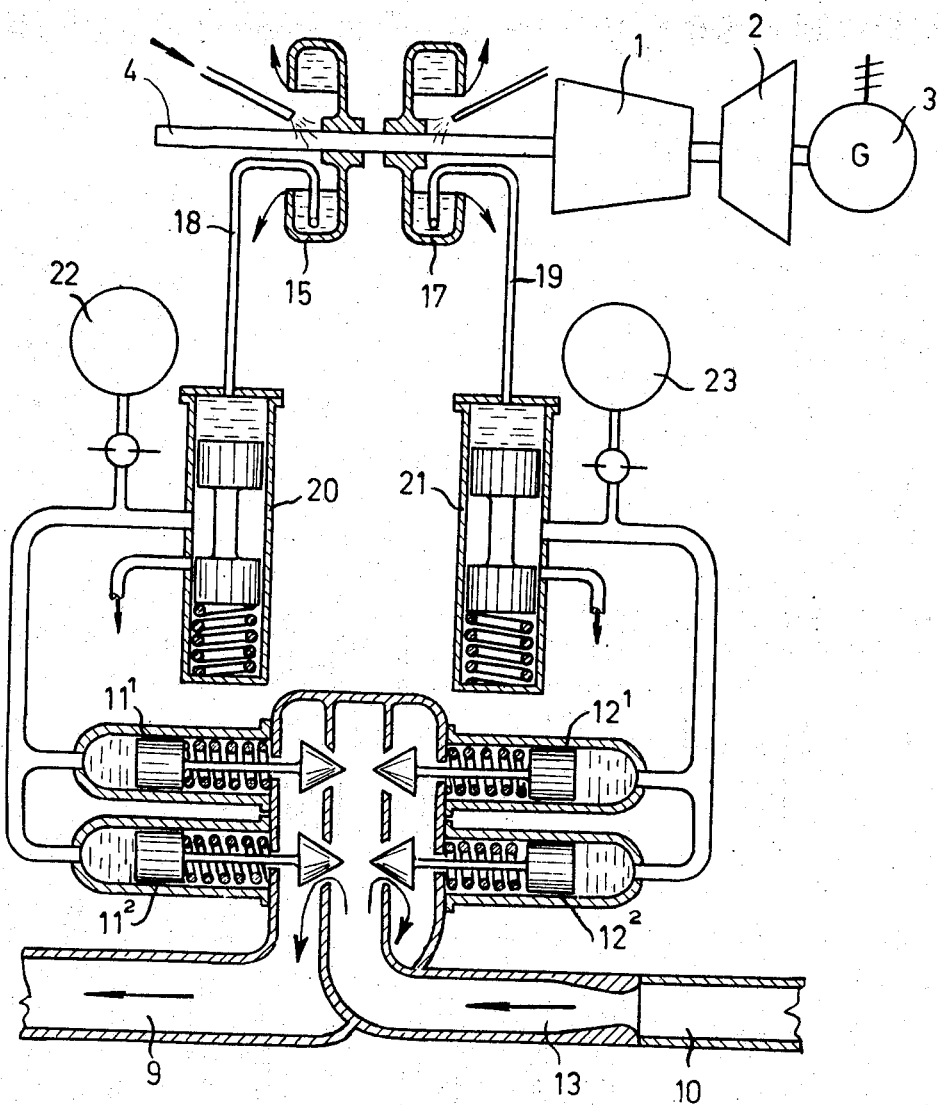
FIG. 2 is a diagrammatic section through another relief arrangement.

In the gas turbine installation according to FIG. 2, in addition to the simple redundance already discussed, an additional redundance exists within the two regulating circuits. The regulating valves 11 and 12 of the constructional example according to FIG. 1 are here each replaced by a pair of regulating valves $11^1$ and $11^2$ and $12^1$ and $12^2$ respectively, which are connected parallel to one another as regards the operating medium.

Furthermore, the governors 15 and 17 are here constructed as speed governors with a rotating liquid ring. These governors are connected by way of transmission ducts 18 and 19 with control slide valves 20 and 21, respectively, serving for the hydraulic amplification, said valves controlling the control oil for the servomotors of the regulating valves $11^1$ and $11^2$ and $12^1$ and $12^2$ respectively, Sources of control oil are indicated at 22 and 23.

I claim:

1. Relief arrangement for a closed gas turbine installation comprising in an endless flow path for the operating medium a compressor, a heater and a turbine; a relief pipe being provided which leads from a position of high pressure in said flow path to a position of lower pressure in said flow path; said relief pipe comprising at least two jointly redundant regulating valves connected parallel to one another as regards said operating medium; the improvement that a quantity limiter connected in series with said regulating valves is incorporated into said relief pipe.

2. Relief arrangement according to the claim 1, in which a constriction in said relief pipe forms said quantity limiter.

3. Relief arrangement according to claim 2, in which said quantity limiter is formed as a Venturi nozzle.

4. Relief arrangement according to claim 1, in which said quantity limiter is constructed as a turbine.

5. Relief arrangement according to claim 1, in which the regulating circuits of said regulating valves have characteristics different from one another.

6. Relief arrangement according to claim 5, in which said regulating circuits have ranges of proportionality which are different from one another.

7. Relief arrangement according to claim 5, in which said regulating circuits have integral or differential values which are different from one another.

* * * * *